United States Patent Office 3,285,901
Patented Nov. 15, 1966

3,285,901
POLYMERIZATION OF ISOPRENE IN THE PRESENCE OF LITHIUM METAL AND AN INERT LIQUID HYDROCARBON
Lawrence E. Forman, Akron, Ohio, assignor to The Firestone Tire & Rubber Company, Akron, Ohio, a corporation of Ohio
No Drawing. Filed Oct. 11, 1962, Ser. No. 229,974
1 Claim. (Cl. 260—94.2)

This application is a continuation-in-part of my copending application, Serial No. 532,097, filed September 1, 1955 now abandoned. In U.S. patent application of Wakefield and Foster, Serial No. 530,396, filed August 24, 1955, now abandoned, there are described new synthetic polyisoprene rubbers having properties very similar to Hevea rubber. The new synthetic polyisoprene rubbers exhibit an essentially cis-1,4-structure by infra-red technique, have high gum tensiles and low hysteresis values when vulcanized, and in elongated condition exhibit X-ray diffraction diagrams typical of a crystalline fiber, the points of maximum intensity of the X-ray diffraction diagrams for a highly elongated synthetic polyisoprene of this type having the same coordinates as the points of maximum intensity of an X-ray diffraction diagram of elongated Hevea rubber. The new synthetic polyisoprene rubbers are produced by polymerizing isoprene in the presence of metallic lithium and in the substantial absence of oxygen, oxygen-containing compounds and polymerizable unsaturated compounds other than isoprene.

The above reaction is quite exothermic and has been found difficult to control. Additionally, in carrying out the polymerization in bulk (either vapor phase or liquid phase), the polymers obtained tend to have molecular weights as indicated by inherent viscosity somewhat lower than natural rubber. It has been observed further that polymers obtained by polymerization of isoprene in bulk tend to contain relatively large quantities of gel, some of which (microgel) is not readily removed by light mastication.

An object of the present invention, consequently, is to provide a method of producing essentially gel-free synthetic rubbery polyisoprene having an essentially cis-1,4-structure. Another object is to provide an improved method of producing a synthetic essentially cis-1,4-polyisoprene having a molecular weight, as indicated by inherent viscosity, more nearly approximating or greater than the molecular weight of Hevea rubber. Another object is to provide an improved method of producing a synthetic essentially cis-1,4-polyisoprene involving a means of readily controlling the exothermic reaction of isoprene in the presence of metallic lithium.

The above and further objects are obtained in accordance with the present invention by polymerizing isoprene in the presence of lithium metal and an inert liquid hydrocarbon as a solvent for the isoprene and in the substantial absence of oxygen, oxygen-containing compounds and polymerizable unsaturated organic compounds other than isoprene. Oxygen-containing organic compounds to be particularly avoided in the polymerization zone are the usual inhibitors conventionally included in commercial isoprene such as t-butyl catechol, and the polymerization promoters and modifiers heretofore recommended for use in alkali metal catalyzed polymerizations such as dimethyl and/or diethyl ether, dimethyl ethers of ethylene glycol, diethylene glycol, triethylene glycol or tetraethylene glycol, dioxane and the like.

Petroleum ether is ideally suited as a solvent for polymerization in accordance with the invention. In view of the previously outlined considerations, precautions should be taken to insure substantial absence of oxygen-containing and/or polymerizable unsaturated organic compounds from the solvent. In the case of reagent grade of petroleum ether, it is only necessary to wash the petroleum ether with sulfuric acid to remove any slight traces of such undesirable compounds. Other suitable solvents for practice of the invention include the liquid saturated aliphatic and cycloaliphatic hydrocarbon solvents such as propane through dodecane including both normal and branched chain compounds of this type, cyclopentane, cyclohexane and the like and mixtures thereof; benzene, toluene, any xylene, ethylbenzene, other liquid alkylbenzenes and mixtures of the foregoing; liquid mono-olefins, including the amylenes, pentene-1, pentene-2, any hexene, any heptene, any octene, any nonene, any decene, butene-1, butene-2 and mixtures of the foregoing; cyclo-olefins, including cyclopentene, cyclohexene, alkyl derivatives of either and mixtures of the foregoing; terpene hydrocarbons, for example, dipentene, pinene, any of the menthadienes, turpentine and the like; unconjugated polyolefins, including pentadiene-1,4, hexadiene-1,4, hexadiene-1,5, squalene, allo-ocimene, dihydromyrcene, a methylpentadiene-1,4. The lower molecular weight solvents are preferred. The solvent preferably is used in an amount equal to, or in excess of, 50% by weight of the total charge of reactants.

Important facts influencing structure of the polymers and speed of the reaction are:
  (1) Purity of monomer
  (2) Purity of catalyst
  (3) Concentration of moisture, air and oxygen
  (4) Temperature of reaction

*Purity of monomer*

Isoprene of high purity should be used. By isoprene of high purity is meant an isoprene of at least more than 90 mol percent purity and preferably in the neighborhood of 95 or more mol percent purity. In general, the purer the isoprene, the faster the reaction rate and the closer the structure and the properties of the resulting polymer to natural rubber. Alpha-acetylenes and other substances which readily react with lithium should be kept at a minimum or removed prior to use, since they use up catalyst and also tend to lower the molecular weight of the resulting polymer. Any inhibitor normally present in a commercial isoprene should be removed (for example, by a conventional technique) prior to polymerization in accordance with the invention. Excellent polymers in accordance with the invention are produced from Pure Grade [1] or Research Grade [2] isoprene. The only purification required of these monomers prior to use is removal of inhibitor therefrom. Desirable polymers in accordance with the invention are also produced from a less pure grade of isoprene [3], which has a purity of about 91–93% and contains minor amounts of acetlyenes and various other impurities which are unremunerative catalyst-consumers, provided the acetylene is removed and the other undesirable impurities are reduced, for example by well known chemical and fractionating methods, to produce a monomer having a purity of about 95% and an index of refraction at 20° C. in the range of about $n_D^{20}=1.4210$ to 1.4216.

*Catalyst preparation*

The catalyst is prepared, either prior to or during polymerization in accordance with the invention, so as to have a large surface area, suitably in the range of about 0.1 to 10 square meters per gram of lithium. Lithium preparations having greater surface areas are quite effec- ---
[1] Supplied by Phillips Petroleum Company, Bartlesville, Oklahoma and represented as having a purity of 99 mol percent and a refractive index at 20° C. of $n_D^{20}=1.422$.
[2] Supplied by Phillips Petroleum Company and represented as having a purity of 99.6 mol percent and a refractive index at 20° C. of $n_D^{20}=1.422$.
[3] Supplied by Enjay Company.

tive catalysts but are ordinarily more difficult to produce. For example, the catalyst can be prepared by melting the metal, immersed in petroleum jelly, and subjecting the molten mass, while maintaining same above the melting point of lithium, to high speed agitation under an inert atmosphere to produce finely divided metallic lithium sand dispersed in the petroleum jelly. The function of the petroleum jelly is to prevent air from contacting the lithium metal. Any other medium, which will perform this function, is also suitable such as other inert hydrocarbon solvents which boil above 200° C., e.g. mineral oil, paraffin and the like. The preparation of the catalyst should be carried out in a closed container of non-reactive material, such as stainless steel or the like. Suitably, a high speed stirrer provides the agitation. Excellent results have been obtained with catalyst dispersions produced as above, wherein the dispersions contained approximately thirty-five percent metallic lithium and the particles of lithium had a mean diameter of about $20\mu$ or a surface area of about one square meter per gram.

The catalyst can be used in any shape or physical form presenting a large surface area of lithium to the isoprene monomer. It can be used as small particles, as disclosed above, more or less spherical in shape, or as platelets, discs, foil, threads or hairlike filaments, which can be chopped up, or in any other conceivable shape.

It is often desirable, in order to reduce what might otherwise be excessive induction periods, continuously to present a fresh lithium metal surface to the reactants in polymerizations of this type. The fresh surface of the metallic lithium is brought about by any mechanical means calculated to continuously polish, abrade or burnish the surface of the lithium metal catalyst inside the polymerization chamber. Such suitable means include the use of spheres of inert material, such as steel balls or cylinders, which are caused to roll along the inner surface of of polymerization chamber either by reason of rotation of the polymerization chamber itself or by reason of the action of a stirring device operating within a stationary polymerization chamber. Still another means of bringing about the same result involves rotation of an iron object against the inner surface of a polymerization chamber by means of an external rotating magnetic field. Other equivalent means of achieving the results of the invention will appear readily to those skilled in the art.

Concentration of moisture, oxygen and air

Moisture in the polymerization zone, since it tends to use up catalyst, should be kept at a minimum. Oxygen, nitrogen and other components of air have been found to inhibit polymerization and consequently should as nearly as possible be kept out of the reaction zone. These gaseous materials are conveniently removed by bringing the polymerization charge to a boil and venting a portion (e.g. about 10%) of the charge from the polymerization vessel prior to sealing the same and effecting polymerization.

Temperature

It has been found that the molecular weight and the proportion of cis-1,4-structure of the polymers in accordance with the invention tend to increase as the temperature of polymerization is decreased. A practical limitation on carrying this generalization to its logical conclusion resides in an increase of the induction period and a reduction of the reaction rate as the temperature is lowered. Polymerization temperatures can range as high as 150° C. or as low as 0° C. or lower. Generally, it is preferred to utilize temperatures lower than and no higher than about 70° C. to 90° C.

Polymerization

Polymers can be made in glass beverage bottles sealed with aluminum lined crown caps. New polymerization bottles should be dry before use. Only a minor proportion of catalyst is necessary, from about 0.00001 to about 1.0 part of lithium metal per 100 parts of isoprene being present at initiation of polymerization. Usually sufficient catlayst is provided to supply between about 0.0001 to about 0.5 part of lithium metal per 100 parts of isoprene at initiation of polymerization.

The catalyst dispersion can be added to the bottle by weight, being transferred from a glass rod or spatula to the monomer solution, or the catalyst can be melted and added by volume. The catalyst can also be added as a suspension of the catalyst in the monomer, or the solvent or in a mixture of monomer and solvent.

The monomer and solvent are added by volume, adding sufficient excess so that about 10% of the charge can be vented. The removal of oxygen from the free space above the monomer in the polymerization bottle, as well as dissolved oxygen in the monomer or solvent is an important step in the bottle loading procedure. In loading the bottle, it is desirable to pass the monomer and solvent through activated silica gel, activated alumina, or other similar functioning material. The cap is placed loosely on the bottle, and the monomer and solvent mixture is brought to a vigorous boil by placing the bottle on a heated sand bath. When 10% of the charge has been vented, the bottle is rapidly sealed. Experiments have demonstrated the importance of excluding air and oxygen since oxygen drastically inhibits polymerization.

After polymerization has been completed, the resulting jelly-like polymer solution is removed. The solvent is removed from the polymer in any suitable manner such as by evaporation, by wet distillation with hot water or steam, or by separation of the polymer by an alcohol or acetone. The crude polymer is washed on a laboratory wash mill to remove the catalyst. Antioxidant is desirably added as soon as the catalyst has been destroyed; operable antioxidants include, for example, phenyl-beta-napthylamine, 2,2,4-trimethyl-6-phenyl-1,2-dihydroquinoline, N,N'-diphenyl-p-phenylenediamine, and other well-known antioxidants for natural rubber. Water washing is resumed after adding antioxidant. Cold water is used to minimize oxidation of the polymer. The washed polymer is sheeted out and dried in vacuo in an oven at 50° C. The dried polymer is bagged to exclude air prior to use. (Note: The polymer after polymerization should be exposed to air for only the minimum time needed to get the polymer out and on the wash mill. Where longer times are needed, the polymer should be protected from the atmosphere, as by immersing it in methanol containing 3% antioxidant.) Larger scale polymerizations are easily effected by applying the above bottle techniques to large scale equipment. Similarly, by modification of the above bottle techniques along conventional lines the polymerizations of the invention are easily effected continuously.

A typical recipe is as follows:

|  | Parts by weight |
|---|---|
| Isoprene | 100.00 |
| Inert hydrocarbon solvent | 300.00 |
| Lithium, as dispersion | 0.15 |

Macrostructure of polyisoprene

Polyisoprenes of the invention have been produced with average molecular weights and weight distributions approximating natural rubber. Many of the polyisoprenes produced in accordance with the invention have average inherent viscosities typical for, or even greater than the value of commercial natural rubber of a good grade. The inherent viscosity figures hereafter are obtained by the procedure of G. D. Sands and B. L. Johnson, Industrial and Engineering Chemistry, vol. 19, page 261 (1947).

Infrared spectroscopic determination of the microstructure of polyisoprene

The amounts of cis-1,4-, trans-1,4-, 1,2- and 3,4-structure in polyisoprene are determined by an infrared spectroscopic method devised by J. L. Binder and associates. The relative amounts of the four structures named are found by measuring the intensities of the infrared absorption bands at 8.85, 8.68, 10.98 and 11.25 microns for the four types of structures, in the order given above and inserting these values into the equations:

(1) $$D^i = e_1^i C_1 + e_2^i C_2 + e_3^i C_3 + e_4^i C_4$$

where $D^i$ = absorbance (optical density) of the polymer at wavelength $i$ $e^i_{1,2,3 \text{ or } 4}$ = the absorptivities of the several structures at wavelength $i$, the subscripts 1, 2, 3 or 4 referring to the several component structures, and $C_{1,2,3 \text{ or } 4}$ = the concentrations of the several structures, the subscripts 1, 2, 3 or 4 referring to the several component structures.

The four equations obtained in this way were solved for $C_1$, $C_2$, $C_3$ and $C_4$, the values of the concentrations of the cis-1,4-, trans-1,4-, 1,2-addition and 3,4-addition in the polymer.

The peak wave lengths selected, and the values of the absorptivities $e^i$ for these wavelengths for the several structures, are tabulated herewith:

| Structures | Molar Absorptivities $e^i$ at Wavelength of— | | | |
|---|---|---|---|---|
| | 8.68 microns | 8.85 microns | 10.98 microns | 11.25 microns |
| 1,2-addition | 3.0 | 3.0 | 149.0 | 9.0 |
| 3,4-addition | 1.5 | 2.0 | 7.0 | 145.0 |
| Cis-1,4-addition | 3.583 | 6.518 | 1.860 | 1.530 |
| Trans-1,4-addition | 5.927 | 1.934 | 2.277 | 1.885 |

*X-ray diffraction evidence of polyisoprene microstructure*

X-ray diffraction patterns of the synthetic polyisoprene rubbers of the invention are identical to the patterns obtained for Hevea rubber. Conventional synthetic polyisoprenes show no crystalline pattern whatsoever. Balata exhibits a crystalline pattern, but one entirely different from that of Hevea. The X-ray diffraction pattern for Balata is typical for crystalline powders.

A more complete understanding of the invention may be had by reference to the examples which follow.

EXAMPLE 1

Reagent grade petroleum ether, as indicated previously, was washed with concentrated sulfuric acid until colorless; thereafter washed with water; and thereafter dried over anhydrous magnesium sulfate. Two samples (A and B) were charged into 28 ounce glass bottles according to the following recipes and including the purified petroleum ether:

| | Parts by Weight | |
|---|---|---|
| | Sample A | Sample B |
| Isoprene [1] | 170.00 | 170.00 |
| Petroleum ether | 0.00 | 100.00 |
| Lithium, as 35% dispersion | 0.73 | 0.73 |

[1] Supplied by Enjay Company and purified as described above to a purity of about 95 mol percent.

In charging the above bottles, the bottles were swept out with an inert gas prior to loading. After charging, the bottles were sealed and subjected to a temperature of 50° C. until polymerization was complete. The polymers were separated from solvent, were washed on a laboratory wash mill to remove alkali, and an antioxidant (3% based on the weight of the polymer) was added to the polymer on the mill. The washed polymers were dried at 52° C. in a vacuum oven. Percent gel, inherent viscosity and infrared structure determinations were made on the two polymers and a typical good grade of Hevea and were as follows:

TABLE 1

| | Sample A | Sample B | Hevea |
|---|---|---|---|
| Gel, percent | 52.70 | 9.80 | 26.3 |
| Inherent viscosity | 3.28 | 3.42 | 8 to 9 |
| Structure indicated by infra-red technique: | | | |
| Percent cis-1,4 | 91.6 | 92.5 | 97.8 |
| Percent trans-1,4 | 0.0 | 0.0 | 0.0 |
| Percent 1,2 | 0.0 | 0.0 | 0.0 |
| Percent 3,4 | 7.9 | 7.2 | 2.2 |

Referring to the above results, it is seen that both of the polymers obtained had microstructures quite similar to Hevea. Sample B, however, obtained according to the process of the invention, contained considerably less gel than either Hevea or a bulk polymer (Sample A) produced without benefit of the invention.

Gum stocks were produced by compounding each of the above three polymers (including Hevea) in the following formula (in each instance, the same compounding ingredients and the same amounts thereof were used).

| | Parts by weight |
|---|---|
| Polymer | 100.0 |
| Zinc oxide | 3.0 |
| Stearic acid | 3.0 |
| Softener | 3.0 |
| Curing agent (sulfur) | 3.0 |
| Accelerator | 1.2 |
| Antioxidant | 1.0 |

The following physical test data was obtained:

TABLE 2

| | Sample A | Sample B | Hevea |
|---|---|---|---|
| Cures at 280° F. 600% Modulus (p.s.i.): | | | |
| 30 minutes | 200 | 100 | 300 |
| 45 minutes | 125 | 200 | 300 |
| 60 minutes | 200 | 150 | 275 |
| 90 minutes | 175 | 150 | 300 |
| Tensile at break (p.s.i.): | | | |
| 30 minutes | 1,075 | 2,450 | 1,650 |
| 45 minutes | 1,350 | 2,800 | 1,575 |
| 60 minutes | 1,175 | 2,425 | 1,925 |
| 90 minutes | 1,175 | 2,450 | 1,875 |
| Elongation, percent: | | | |
| 30 minutes | 950 | 1,030 | 800 |
| 45 minutes | 940 | 1,020 | 780 |
| 60 minutes | 920 | 1,010 | 810 |
| 90 minutes | 910 | 980 | 800 |
| Williams Plasticity: | | | |
| $y3$ (212° F.) (Polymer) | 5.6 | 5.5 | 4.1 |
| Recovery | 1.2 | 0.9 | 0.6 |
| $y3$ (212° F.) (Stock) | 2.3 | 2.5 | 1.6 |
| Recovery | 0.1 | 0.1 | 0.0 |

Referring to the above data it is seen that the gum tensile for Sample B (in accordance with the invention) is considerably higher than the gum tensile for Sample A (not in accordance with the invention).

EXAMPLE 2

When one uses an isoprene of greater purity, higher molecular weight synthetic polyisoprenes are obtained as previously pointed out. As an illustration of this, Pure Grade isoprene [1] was used in the following polymerization Two samples (C and D) were charged into 28 ounce glass bottles according to the following recipe:

| | Parts by Weight | |
|---|---|---|
| | Sample C | Sample D |
| Isoprene | 50.00 | 50.00 |
| Petroleum ether, reagent grade | 0.00 | 200.00 |
| Lithium, as 35% dispersion | 0.15 | 0.15 |

[1] Supplied by Phillips Petroleum Company.

Polymerization of Sample C was carried out at 50° C. until completion. Polymerization of Sample D was carried out at 30° C. As in Example 1, percent gel, inherent viscosity and microstructure were determined for these two polymers and were as follows:

TABLE 3

|  | Sample C | Sample D |
|---|---|---|
| Gel, percent | 23.80 | 1.30 |
| Inherent viscosity | 4.55 | 11.13 |
| Structure indicated by infra-red technique: |  |  |
| Percent Cis-1,4 | 93.0 | 94.3 |
| Percent Trans-1,4 | 0.0 | 0.0 |
| Percent 1,2 | 0.0 | 0.0 |
| Percent 3,4 | 6.7 | 5.5 |

Referring to the above data, it is apparent that by using the technique of the invention Sample D had an inherent viscosity and corresponding molecular weight much higher and more nearly approximating that of Hevea rubber than did Sample C which did not have the benefit of the improved technique of the invention. Additionally, it is seen that by use of the improved technique of the invention Sample D contained essentially no gel, whereas Sample C contained a substantial amount of gel.

EXAMPLE 3

As an illustration of the practice of the invention involving a different solvent, the following recipe (the isoprene and metallic lithium were of the same grade and purity as used in the preceding example) was polymerized at 30° C. The monomer and solvent, in this case, were passed through a column of activated silica gel prior to charging.

| | Parts by weight |
|---|---|
| Isoprene | 100.00 |
| n-pentane | 300.00 |
| Lithium, as 35% dispersion | 0.15 |

The polymerization bottle contained a 2 by ¼ inch iron bar, and the charged bottle was agitated on a horizontal roller throughout the polymerization period. Inherent viscosity was determined on the resulting polymer to be 9.46 and the polymer contained 9.8% gel.

EXAMPLE 4

As an illustration of a larger scale preparation of polymer in accordance with the invention, a pilot plant polymerization of the following recipe was carried out in a 50-gallon reactor:

| | Parts by weight |
|---|---|
| Isoprene [1] | 100.00 |
| Petroleum ether, reagent grade | 300.00 |
| Lithium, as 35% dispersion | 0.13 |

[1] Pure Grade supplied by Phillips Petroleum Company.

The polymerization was carried out at about 85° F. to 100° F. Upon completion of the polymerization, the reaction mixture was removed from the reactor and soaked in isopropanol to coagulate the polymer and separate it from the petroleum ether solvent. After soaking, the polymer was washed on a mill with cold water and at the end of the washing 3% of an antioxidant was added to the polymer. The polymer was then dried in a vacuum oven at 50° C. The inherent viscosity of the resulting polymer was 10.7. The polymer and a typical high grade Hevea rubber were each compounded according to the following formula:

| | Parts by Weight |
|---|---|
| Polymer | 100.0 |
| Zinc oxide | 3.0 |
| Stearic acid | 2.6 |
| Softener | 3.0 |
| Carbon black | 50.0 |
| Sulfur | 2.6 |
| Accelerator | 0.75 |
| Antioxidant | 1.6 |

The physical properties of these two compounds were:

|  | Hevea | Sample D |
|---|---|---|
| Cured 60 minutes at 280° F.: |  |  |
| 300% Modulus, p.s.i | 2,125 | 1,750 |
| Tensile, p.s.i | 3,825 | 3,550 |
| Elongation, percent | 480 | 540 |
| Cured 45 minutes at 280° F.: |  |  |
| Forced Vibrator at 100° C.: |  |  |
| Dynamic modulus, p.s.i | 198 | 200 |
| Internal friction, kilopoises | 2.8 | 2.5 |
| Ring Tensile at 212° F.: |  |  |
| Tensile, p.s.i | 2,125 | 1,875 |
| Elongation, percent | 480 | 450 |
| Firestone Flexometer: |  |  |
| Running temperature, °F | 226 | 224 |
| Blowout time, minutes | 25 | 31 |

The above compounds were each built into an 8:00-15 tire of standard construction as the tread thereof. The tires were mounted and run on a test fleet car at high speeds. Assigning an arbitrary par wear value of 100 to the tire having the Hevea rubber tread, the tire having the synthetic polyisoprene rubber tread in accordance with the invention (Sample D) exhibited after 12,000 miles a wear rating of 92. The Hevea tread after 12,000 miles was badly cracked whereas the synthetic polyisoprene tread in accordance with the invention exhibited only slight tread cracking. Resistance of the polyisoprene rubber to flexcracking is outstanding.

The polymerization of the invention is carried out, as is discussed above, in the substantial absence of oxygen and oxygen-containing compounds, by which is meant organic compounds and those inorganic compounds reactive with lithium metal, including water, carbon dioxide and the like, but excluding silica, glass and other oxygen-containing substances which do not readily react with lithium. By substantial absence is meant less than 0.001 mole of the oxygen-containing compound per 100 grams of isoprene, and preferably less than 0.0001 mole per 100 grams of the monomer.

I claim:

A method of producing a substantially gel free rubbery synthetic essentially cis-1,4-polyisoprene which comprises polymerizing isoprene at a temperature of not more than about 150° C. in the substantial absence of oxygen and oxygen-containing compounds reactive with lithium and in the presence of metallic lithium and an inert hydrocarbon solvent which is liquid under the reaction conditions, there being sufficient metallic lithium present at the initiation of polymerization to provide at least 0.00001 part by weight of active lithium element per 100 parts of monomer present.

References Cited by the Examiner

UNITED STATES PATENTS

| 1,073,116 | 9/1913 | Harries | 260—94.2 |
| 2,506,857 | 5/1950 | Crouch | 260—94.2 |

FOREIGN PATENTS 545,193  5/1942  Great Britain.

OTHER REFERENCES

Baron, Modern Synthetic Rubber, Chapman & Hall, Ltd., London, 3rd ed., 1949, TS1925B3 1949, page 182 relied on.

Ziegler et al.: "Die 'Katalyse' der Polymerization von ungesattigten Kohlenwasserstossen durch alkaliorganische Verbindungen," Annalen der Chemie (Justus Liebigs), vol. 511, April 12, 1945, pages 45–88.

JOSEPH L. SCHOFER, Primary Examiner.

LEON J. BERCOVITZ, Examiner.

C. R. REAP, E. J. SMITH, Assistant Examiners.